United States Patent [19]

Masuda

[11] 4,188,101
[45] Feb. 12, 1980

[54] ROTATABLE SLIDE HOLDER

[76] Inventor: Hironori Masuda, 34-35 33rd St., Long Island City, N.Y. 11106

[21] Appl. No.: 810,866

[22] Filed: Jun. 28, 1977

[51] Int. Cl.$^2$ .............................................. G03B 1/48
[52] U.S. Cl. .................................................... 353/95
[58] Field of Search .................................. 353/95, 103

[56] References Cited

U.S. PATENT DOCUMENTS

| | | | |
|---|---|---|---|
| 2,597,449 | 5/1952 | Cassidy et al. | 353/101 |
| 2,953,966 | 9/1960 | Leitz et al. | 353/95 |
| 2,960,906 | 11/1960 | Fogel | 353/12 |
| 3,881,814 | 5/1975 | Madison | 353/95 |
| 3,923,390 | 12/1975 | Susko | 353/95 |

Primary Examiner—Steven L. Stephan
Attorney, Agent, or Firm—Darby & Darby

[57] ABSTRACT

A rotatable slide holder adapted for use in slide projectors is disclosed. The slide holder includes first and second spaced members adapted to grip and maintain a slide to be projected in the space therebetween. Spring loaded screws between the first and second members for rotationally fixing the members relative to one another and for biasing the members toward one another. The first and second spaced members are rotationally coupled to the body of the projector so that the members can rotate about an axis perpendicular to a slide positioned in the space between the members. A drive motor is mounted on the projector body and is coupled to the slide maintaining members for causing their rotation. In a first embodiment of the invention one of the spaced members has a circular cross-section and is formed with four uniformly spaced detents in the outer surface thereof. The drive motor switch is a pantograph, one leg joint of which is positioned to cooperate with the detents. Removal of the leg joint from the detent permits rotation of the slide holder and simultaneously activates the drive motor. The reinsertion, after a 90 degree rotation of the slide holder, of the pantagraph joint into a detent rotationally locks the slide holder and deactivates the drive motor. In a second embodiment of the invention one member of the slide holder is a cam wheel and the motor activating switch includes a cam roller. Activation of the drive motor causes the cam wheel to rotate thereby uring the cam roller out of a cam wheel detent. The movement of the cam roller into the following cam wheel detent deactivates the drive motor.

1 Claim, 7 Drawing Figures

ROTATABLE SLIDE HOLDER

BACKGROUND OF THE INVENTION

This invention relates to slide holders for slide projectors and more particularly to such slide holders which can rotate about an axis parallel to the axis of projection while they maintain a slide in position for projection.

Slide projectors of the type presently known in the art customarily include a slide magazine in which a number of slide transparencies are arranged for sequential insertion into projection position in a holder located between a projector lamp and a projector lens system. Conventionally, prior to viewing, the slides are arranged within the magazine so as to insure that they are properly oriented, that is, with the correct side upwards. Projectionists have frequently discovered to their chagrin, however, that one or more of the slides positioned in a magazine have been positioned upside down and are so projected onto the viewing screen. The conventional solution has been to return the slide to the magazine, thereby moving the incorrectly oriented slide out of the projection axis, remove the slide from the magazine, reorient the slide, reinsert the slide into the magazine and shift the slide into the carrier which is located in the projection axis. Such a solution has frequently been found unsatisfactory in that it is time consuming and, in the darkness of a projection environment, is difficult to accomplish.

SUMMARY OF THE INVENTION

It is, therefore, an object of the present invention to provide a rotatable slide holder by means of which the aforesaid drawbacks and disadvantages may be most efficaciously avoided.

It is a further object of this invention to provide a rotatable slide holder which can rotationally re-orient a slide while the slide is in the holder in position for projection.

It is still another object of the invention to provide such a rotatable slide holder which rotates a slide positioned therein in 90° increments.

Generally speaking, the objectives of the present invention are attained by the provision of a rotatable slide holder comprising support means, slide gripping means including first and second spaced members adapted to maintain a slide between the members, means for rotationally fixing the members relative to one another, coupling means for rotationally coupling the slide gripping means to the support means whereby the gripping means is adapted to rotate about an axis perpendicular to the plane of a slide maintained between the first and second members, and drive means mounted on the support means and coupled to the gripping means for rotating the gripping means.

BRIEF DESCRIPTION OF THE DRAWINGS

The foregoing and other objects and features of the present invention will be more clearly understood from the following detailed description thereof when read in conjunction with the accompanying drawings, in which.

DESCRIPTION OF THE PREFERRED EMBODIMENTS

Figure 1:
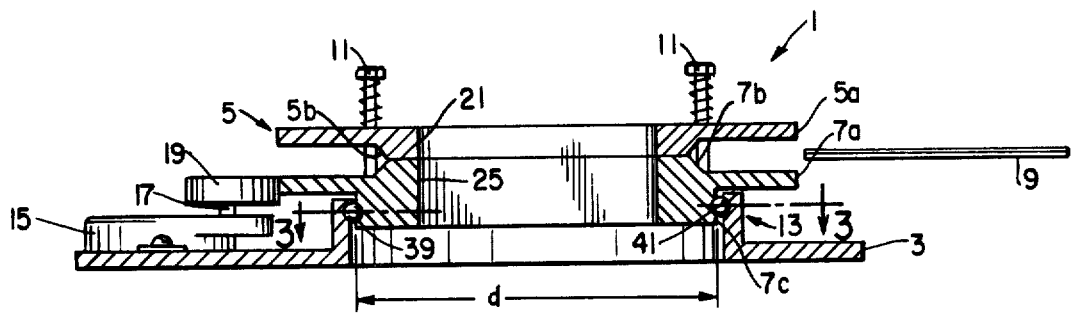
FIG. 1 is a cross-sectional plan view of a rotatable slide holder according to the invention.

Turning now to FIG. 1, there is shown a rotatable slide holder indicated generally at 1 which is rotationally coupled to a portion of the slide projector schematically indicated at 3. The rotatable slide holder includes a first member 5 and a second member 7. The members 5 and 7 are spaced from one another by a distance sufficient to permit the positioning of a photographic slide, indicated at 9, therebetween. The members or sections 5 and 7 are connected to one another by connectors 11, here illustrated as spring loaded screws, which serve to rotationally fix the members 5 and 7 relative to one another. In addition, the spring loaded connectors 11 further permit selectively varying the spacing between the members 5 and 7 so that slides of varying thickness can be accommocated and they further serve to bias the members 5 and 7 so as to urge them toward one another, thereby insuring the firm gripping of the slide to be projected between the members. An extension or portion 7a of the member 7, which portion has a circular cross-section, is telescopically maintained within a circular coupling receptacle 13 which may be integrally formed as part of the slide projector or may otherwise be rigidly affixed thereto. Mounted on the slide projector 3 is a motor 15 having a rotating shaft 17 fixedly connected to a friction drive wheel 19 which is in rotational contact with the member 7. The member 7 may also be coated with rubber so as to increase the coefficient of friction between the member 7 and the drive wheel 19.

Figure 2:
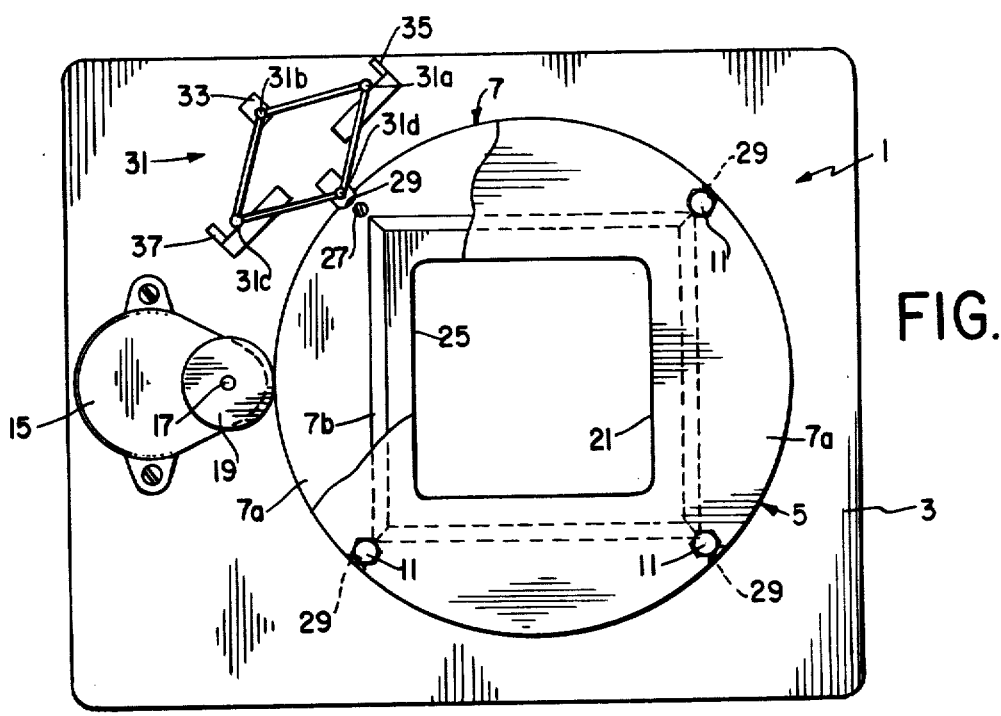
FIG. 2 is a plan view of a portion of the slide holder illustrated in FIG. 1.
Figure 3:
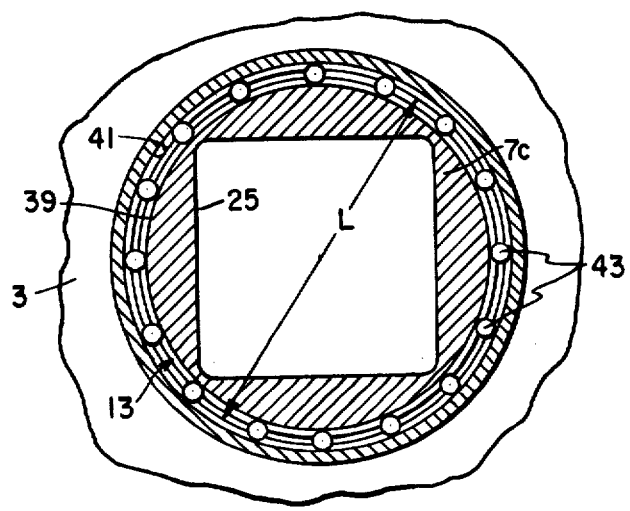
FIG. 3 is a cross-sectional plan view of a portion of the rotatable slide holder, taken along line 3—3 of FIG. 1, which is used to rotationally couple the slide gripping member to the projector.

The structure of the device and the operation thereof will now be described in detail. Referring to FIGS. 1–3, it will be seen that member 5 includes a portion or section 5a having a circular cross-section and a portion 5b having a truncated conical configuration. The member 5 is formed with a centrally positioned rectangular aperture 21 having dimensions at least as large as the dimensions of that portion of the slide which is to be projected. The portion 5 is formed with four holes, indicated at 23 which receive the spring loaded connectors 11.

The portion 7, which cooperates with the portion 5 to form the slide gripping structure, includes a first portion 7a having a generally circular cross-section, a portion indicated at 7b having a truncated conical configuration and a portion 7c having a generally circular cross-section, the portion 7c having an outer diameter indicated at d. The member 7 is formed with a rectangular aperture 25 therein, the dimensions of which correspond to the dimensions of the aperture 21 formed in the member 5. The member 7 is formed with four holes, indicated at 27, which holes correspond to, and are aligned with, the holes 23 formed in the member 5 for receiving the spring loaded connectors 11. The member 7, and more specifically the portion 7a thereof, is formed with four indentations, indicated at 29, spaced 90° from one another, which indentations act as detents in a manner which will be described below.

Illustrated schematically in FIG. 2 is a switch indicated generally at 31 which switch is configured in a pantograph arrangement. As indicated, the pantograph 31 includes four leg junctions indicated at 31a, 31b, 31c and 31d. It will be understood that when the junction 31b is moved in a direction toward the junction 31b by, for example, a pushbutton such as that schematically indicated at 33, the leg junctions 31a and 31c will move away from one another. By electrically connecting the junctions 31a and 31c and by providing electrical switch contacts as indicated at 35 and 37, it will be understood that the movement of junctions 31b and 31d toward one another can cause the completion of an electrical circuit which includes the contacts 35 and 37 and the junctions 31a and 31c. In the same manner, the movement of the leg junction 31d into one of the detents 29 results in the movement of the junctions 31b and 31d away from one another and the movement of the junctions 31a and 31c toward each other, this latter movement causing the opening of the electrical circuit which includes the contact 35 and 37.

The coupling member 13 has a tubular configuration including an inner wall 39 and an outer wall 41 spaced therefrom, the space between the two walls forming a bearing race in which are located a plurality of ball bearings 43 so that the wall 39 may rotate relative to the wall 41. The outer wall 41 of the member 13 is fixed to the body of the slide projector 3 in any conventional manner. The inner wall 39 has a diameter indicated as L, which diameter is slightly larger than the diameter of the portion 7c of member 7 which was indicated as d. The reason for these relative diameters will be apparent upon viewing FIG. 1 where it is seen that the portion 7c of the member 7 fits snugly within the member 13 and is easily rotatable therein due to the presence of the roller bearings 43. It will be understood, of course, that a similar result can be obtained through other conventional means, such as, for example, the use of low friction materials for the inner wall 39 and the outer surface of the portion 7c.

Turning now more specifically to the operation of the instant invention, it is seen in FIG. 1 that the member 13 which is fixed to the projector body 3 receives the member 7, and more specifically the portion 7cthereof, snugly and rotatably. The members 5 and 7 are maintained rotationally fixed relative to one another by means of the spring loaded connectors 11 and they are rotatable relative to the projector 3. Adjustment of the spring loaded connectors 11 permits both the varying of the spacing between the members 5 and 7, and more specifically, between the portions 5b and 7b, and biases the members 5 and 7 toward one another. A conventional photographic slide 9 may be inserted into the space between the portions 5b and 7b and it may be there maintained and gripped by the pressure provided by the members 5 and 7. In the event that, upon projection of a slide, it is found that the slide is incorrectly oriented in that it is rotated a multiple of 90° from its correct projection orientation, the slide holder, members 5 and 7, may be rotated to properly orient the slide.

Re-orientation of the slide to its correct orientation while it is being projected is accomplished by depressing the leg junction 31b of the pantograph switch 31 by means of the button 33, thereby raising the leg junction 31d out of the detent 29 in which it was located. This removal of the leg junction 31d from the detent 29 releases the members 5 and 7 for rotation about an axis perpendicular to the plane of the slide since, as will readily be understood, the leg junction 31d acts as a lock preventing rotation of the members 5 and 7. The relative movement of the leg junctions 31b and 31d toward one another, as above discussed, causes the leg junctions 31a and 31c to move apart from one another and to make contact with the motor switch terminals 35 and 37, this completion of the schematically illustrated electrical circuit causing the motor 15 to be activated. Activation of the motor 15 causes the rotation of the friction drive wheel 19 which is in frictional contact with portion 7a of the member 7. It will be understood of course that, although the instant structure is illustrated with the drive wheel 19 in contact with the portion 7a of the member 7, the rotational drive could be easily provided to, for example, the portion 5a. It will further be realized, of course, that it is not necessary that a friction drive be utilized, but rather, any conventional drive structure, such as gearing or belts could be used. Once the motor 15 has been activated and the members 5 and 7 have begun their rotation, it will be clear that the leg junction 31d is maintained in its close position relative to the leg junction 31b by the outer surface of the portion 7a. After the members 5 and 7 have rotated so that the next adjacent one of the four detents is aligned with the leg junction 31d, the leg junction 31d will move into such next adjacent detent. The movement of the leg junction 31d into a detent, under the influence either of gravity or of, for example, a spring, causes the combination of members 5 and 7 to be rotationally locked and simultaneously causes the motor 15 to be deactivated. This latter result is due to the fact that the movement of the leg junction 31d into a detent 29 causes the relative separation of the junctions 31d and 31b, this in turn causing the junctions 31a and 31c to move toward one another, thereby breaking contact with the switch contacts 35 and 37 and opening the electrical circuit. It is thus seen that each time the button 33 is depressed the locking leg junction 31d is removed from a detent and the members 5 and 7 rotate 90°.

Figure 4:
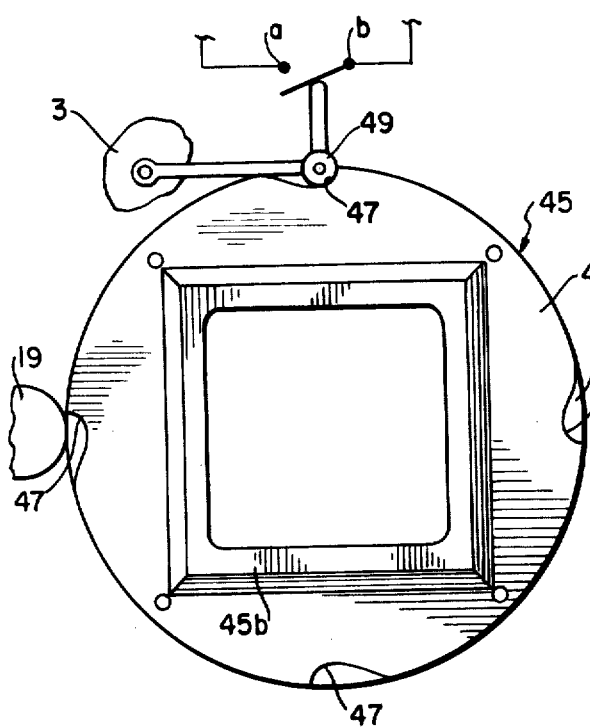
FIGS. 4 and 5 are front and top plan views of a second embodiment of a portion of the slide holder which may be substituted for the portion illustrated in FIG. 2
Figure 6:
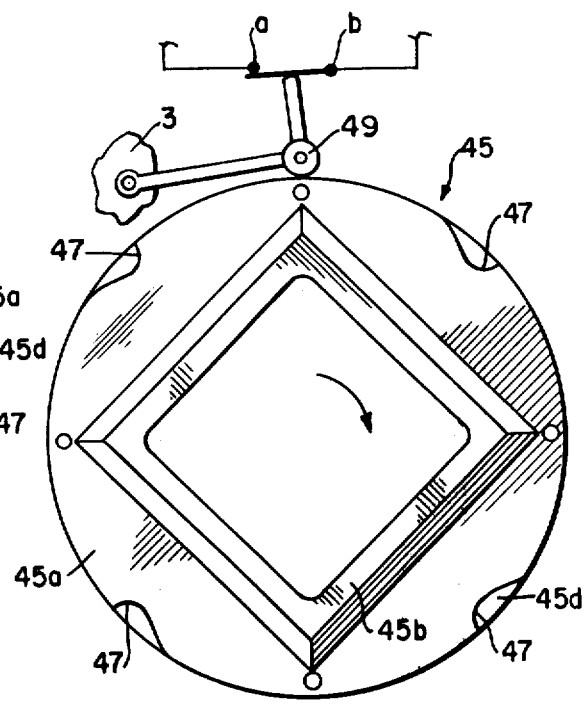
FIG. 6 illustrates the configuration of the portion illustrated in FIG. 4 during rotation.
Figure 5:
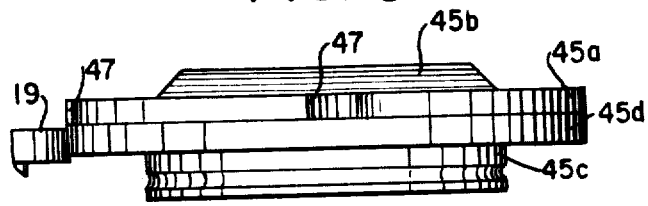

Turning now to FIGS. 4-6 there is illustrated an alternative embodiment of a portion of the apparatus which may be substituted for the member 7 and which is generally indicated at 45. The member 45 includes portions 45b and 45c (FIG. 5), which correspond to the portions 7b and 7c, respectively. The portion 45a of the member 45 has a somewhat circular cross-sectional configuration and is a cam wheel. The portion 45d has a circular cross-section and will be more fully discussed below. The cam wheel 45a is formed with four indentations or detents, indicated at 47, each of which is spaced 90° from the next adjacent detent. The mechanical switching structure utilized with the embodiment indicated at 45 is schematically illustrated in FIG. 4 and the electrical circuit utilized is schematically illustrated in FIG. 7.

Turning first to the mechanical switching structure, it will be noted that it includes a cam roller 49 which may be mounted in any convenient location, for example, it may be connected to the projector frame 3. When the roller 49 is in a detent 47 the motor switch contacts, indicated at a and b, are separated, and the motor 15 is deactivated. When the cam roller 49 is on a portion of the cam wheel 45a spaced from a detent 47, the contacts a and b are electrically connected, as indicated in FIG. 6, and the motor 15 is activated. After the cam wheel 45a has rotated 90° the cam roller 49 drops into a detent thus causing the switches a and b to separate and thereby deactivating the motor 15. It is thus seen that the embodiment illustrated in FIGS. 4–6 functions to rotate a slide in the slide holder in much the same manner as that described above with respect to the member 7. It will be noted, however, that inasmuch as the portion 45a does not have a cross-sectional configuration which is as circular as that of the portion 7a, it will be advantageous to drive the slide holder by means of contact between the drive wheel 19 and the portion 5a, rather than through contact with the portion 45a. It is for this reason that the portion 45d is incorporated into this embodiment. The portion 45d is fixedly connected to, or integrally formed with, the portion 45a. Inasmuch as the portion 45d has a circular cross-section, it is particularly adapted to be driven by the wheel 19 and this drive arrangement is clearly shown in FIG. 5.

Figure 7:
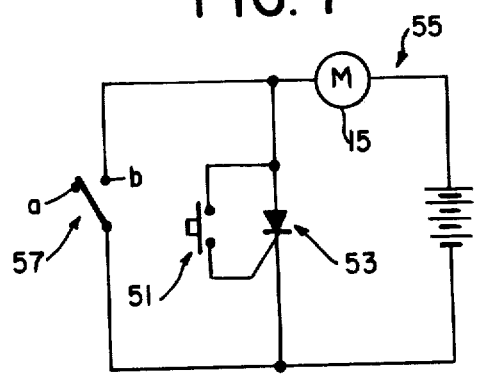
FIG. 7 is a schematic diagram of an electrical circuit which can be used with the embodiment illustrated in FIGS. 4–6 for rotating the slide holder.

Turning now to FIG. 7, the electrical operation of the structure illustrated in FIGS. 4–6 will be briefly discussed. A pushbutton switch indicated at 51 is connected across a silicon controlled rectifier (SCR) indicated at 53 and activation of the switch 51 completes the circuit indicated at 55 to activate the motor 15. Activation of the motor 15 results in the rotation of the member 45. Rotation of the member 45 causes the cam wheel 49 to move out of the detent 47 in which it was positioned thereby moving the switch contact a into electrical connection with the switch contact b. Closure of the contacts a and b causes the short-circuiting of the SCR 53 thereby turning off the SCR. The motor 15, however, continues to operate due to the closure of the contacts a and b of the switch 57. After the member 45 has rotated 90° the cam roller 49 will drop into the next following detent 47, thereby opening the switch 57 and deactivating the motor 15.

Although the instant invention has been illustrated in the drawings without discussing the physical positioning of the switches 31 or 57, it will be understood that they can be located at any point about the portions 7a and 45a, respectively. The only limitation on the location of either of the switches 31 and 57 is that it be positioned so that the portions 7a and 45a are properly oriented for slide projection when the motor 15 is deactivated. It may, of course, be advantageous to locate the leg junction 31d or the cam roller 49 above the respective member 7 or 45 so as to take advantage of gravity, but a similar result can be accomplished by appropriately spring loading the leg junction 31d or the cam roller 49. Further, it may be advantageous to position the leg junction 31d or the cam roller 49 180° away from the location of the drive wheel 19 so as to augment the support provided to the slide holder by the combination of the member 13 and the projector frame 3.

It will be understood that the foregoing description of the preferred embodiments of the present invention is for purposes of illustration only, and that the various structural and operational features as herein disclosed are susceptible to a number of modifications and changes none of which entail any departure from the spirit and scope of the present invention as defined in the hereto appended claims.

What is claimed is:

1. A rotatable slide holder comprising:

support means;

slide gripping means including first and second spaced members adapted to maintain a slide between said members, one of said members being formed with four detents, each of said four detents being spaced 90° from the next adjacent one of said four detents, said member formed with said detents having a generally circular cross section and said detents geing indentations formed in the outer surface of said member;

means for rotationally fixing said members relative to one another;

coupling means for rotationally coupling said slide gripping means to said support means whereby said gripping means is adapted to rotate about an axis perpendicular to a plane of a slide maintained between said first and second members;

drive means mounted on said support means and coupled to said gripping means for rotating said gripping means; and switching means coupled to said drive means and sequentially interacting with each of said detents for controlling the operation of said drive means, said swiching means comprising a pantograph, one leg junction comprising said locking means and the two leg junctions adjacent said one junction comprising the contacts of said switching means, said switching means including locking means such that rotation of said gripping means is prevented and said drive means are deactivated when said locking means are moved into engagement with a detent.

* * * * *